US008838973B1

(12) United States Patent
Yung et al.

(10) Patent No.: US 8,838,973 B1
(45) Date of Patent: Sep. 16, 2014

(54) USER AUTHENTICATION METHOD

(75) Inventors: Marcel Mordechai Moti Yung, New York, NY (US); Omer Berkman, Tenafly, NJ (US)

(73) Assignee: Google Inc., Mountain View, CA (US)

( * ) Notice: Subject to any disclaimer, the term of this patent is extended or adjusted under 35 U.S.C. 154(b) by 334 days.

(21) Appl. No.: 13/407,105

(22) Filed: Feb. 28, 2012

Related U.S. Application Data

(60) Provisional application No. 61/447,236, filed on Feb. 28, 2011.

(51) Int. Cl.
*G06F 9/00* (2006.01)
*G06F 15/173* (2006.01)

(52) U.S. Cl.
USPC ........... 713/175; 713/165; 713/166; 713/172; 713/186; 726/2; 726/5; 726/10

(58) Field of Classification Search
USPC ........................................................ 713/171
See application file for complete search history.

(56) References Cited

U.S. PATENT DOCUMENTS 7,114,080 B2 * 9/2006 Rahman et al. ............... 713/186
8,312,519 B1 * 11/2012 Bailey et al. ...................... 726/6
2002/0144128 A1 * 10/2002 Rahman et al. ............... 713/186
2006/0041759 A1   2/2006 Kaliski, Jr. et al.
2009/0328168 A1 * 12/2009 Lee ..................................... 726/6

OTHER PUBLICATIONS

Higgins, "Researchers See Real-Time Phishing Jump," from Dark Reading Security, http://www.darkreading.com/taxonony/index/printarticle/id/228200550, Nov. 9, 2010, accessed on Dec. 20, 2010, 2 pages.
Kaliski, Burt and Magnus Nyström, "Password-Protection Module," Jul. 22, 2004, 15 pages.
"Enhancing One-Time Passwords for Protection against Real-Time Phishing Attacks," RSA Laboratories, http://www.rsa.com/rsalabs/node.asp?id=2991, Jan. 16, 2006, accessed on Jan. 4, 2011, 2 pages.
"Enhancing One-Time Passwords for Protection Against Real-Time Phishing Attacks," Technology Backgrounder, RSA Security, Jan. 16, 2006, 12 pages.

* cited by examiner

*Primary Examiner* — Randy Scott
(74) *Attorney, Agent, or Firm* — Morris & Kamlay LLP

(57) ABSTRACT

Reflective factors are used in combination with a, one-time password (OTP) in order to strengthen a system's ability to prevent man in the middle (MITM) phishing attacks. These reflective factors may include information such as URL information, HTTPS, a server's certificate, a session key, or transaction information. These reflective factors help to ensure that a client that wishes to access a server is the legitimate client, because even if a phisher (including a phisher attacking the legitimate client in real time) records identifying information from the legitimate client, it cannot replicate the reflective information to authenticate itself with the server.

26 Claims, 5 Drawing Sheets

USER AUTHENTICATION METHOD

CROSS REFERENCE TO RELATED APPLICATIONS

The present application claims the benefit of U.S. Provisional Patent Application No. 61/447,236, filed Feb. 28, 2011, which is incorporated herein by reference in its entirety.

BACKGROUND

Phishing attacks are a general class of threats, aimed at accessing users' personal and financial accounts and data. Phishing operates by tricking the user into providing information and credentials which facilitate access to such accounts and data. An estimated 300 to 600 million phishing emails are sent every day all over the world. Many of these phishing attacks target users' online accounts, in particular bank accounts. To mitigate such attacks and enhance their security mechanisms in general, institutions such as banks and universities are starting to require two-factor authentication schemes which employ one time passwords (OTPs).

In these two-factor authentication schemes, the first factor, also known as the weak factor, is usually a traditional user name and password and/or other fixed data. The second factor, the OTP, referred to as the strong factor, is usually a piece of pseudorandom data. A device generates the OTP in real time when activated by the user by using a cryptographic key that is shared with the server. The device that generates the OTP is typically a hardware token. For example, a token such as RSA's SECURID or a smartphone may generate the OTP. Alternatively, OTP transmission may occur by another channel (e.g. SMS), generation by an application on the user's computer, or the use of biometric data such as voice data, fingerprint data, or similar information.

Unfortunately, phishers are adapting to the use of OTPs by using real-time man in the middle (MITM) attacks. Recently, the incidence of real-time MITM attacks has increased. In these attacks, the attacker phishes the user, tricking the user into revealing her name and password as well as her current OTP. The attacker then uses this information in real time to access the user's account. While the OTP may guarantee to the server that the user is involved, it does not guarantee that the party that submits the OTP is the user as opposed to an MITM attacker.

In authentication methods, some binding of challenges to the response has been used. Specifically, in SSL/TLS, the network establishes a connection based on a server certificate whose name must match at least part of the host name. However, client-side certificates are hardly ever used in consumer client-server authentication. Furthermore, client-side software certificates cannot be used when the user logs in from an unknown computer, such as at an Internet cafe.

Techniques with smart mobiles suggest a two-factor authentication scheme based on a smart mobile phone or other smart device. For example, the phone may keep the server's public key. The phone may use the public key to encrypt the user name and password that the user types into the phone instead of into her computer. The encrypted password acts like an OTP. This scheme is susceptible to a MITM phishing attack, however, and in case of such an attack, the protocol will end with a secure (SSL/TLS) session between the server and phisher, as well as between the phisher and the browser. Thus, the security of further transactions relies on authenticating each transaction by using the session key established between the server and the mobile phone. Another technique implements an SSL/TLS two-way authentication protocol with a client certificate stored in the mobile phone in order to mitigate online phishing attacks.

URL-based cryptographic tokens have been another option. For example, some technology uses entangling to allow pseudonymous, which is anonymous, but still personalized, web browsing, as well as anti-spam. Other technology uses entangling to provide, among other things, a unique password per URL to prevent the usage of the same password everywhere.

Thus, there is a clear need for an authentication scheme that mitigates MITM phishing attacks by preventing the phisher from successfully using a user's real-time generated OTP.

SUMMARY OF THE INVENTION

Embodiments relate to security measures for protecting a user from real-time phishing attacks.

According to an embodiment, a computer-implemented method is designed to guarantee session integrity between a user at a client machine and a server. The method begins by sending a request for access to information on the server by the client machine. A request is then received by the client machine from the server to transmit a user reflective one-time password (ROTP) from the client machine to the server. Next, parameters are combined including a cryptographic key, one-time password (OTP) information, and reflective information. A user ROTP is then generated using a secure cryptographic algorithm on the combined parameters. The generated user ROTP is then transmitted to the server.

According to another embodiment, a computer-implemented method is designed to guarantee session integrity between a user at a client machine and a server. The method begins by receiving a request for access to information on the server from the client machine. A request is then transmitted for a user ROTP from the server to the client machine. Next, a user ROTP is received from the client machine by the server. Parameters are then combined including a cryptographic key, one-time password (OTP) information, and reflective information A server ROTP is then generated using a secure cryptographic algorithm on the combined parameters. The user ROTP is then verified by comparing it to the server ROTP and access is provided to the requested information only when the user ROTP is valid.

According to another embodiment, a system is designed to guarantee session integrity between a user at a client machine and a server. The system includes an ROTP request module that sends a request for access to information on the server by the client machine. The system further includes an ROTP transmission control module that receives a request by the client machine from the server to transmit a user reflective one-time password (ROTP) from the client machine to the server. The system further includes an ROTP processing module that combines parameters comprising a cryptographic key, one-time password (OTP) information, and reflective information and generates a user ROTP using a secure cryptographic algorithm using the combined parameters. The system finally includes an ROTP transmission module that transmits the generated user ROTP to the server.

According to another embodiment, a system is designed to guarantee session integrity between a user at a client machine and a server. The system includes an ROTP request module that receives a request for access to information on the server from the client machine, transmits a request for a user ROTP from the server to the client machine, and receives a user ROTP from the client machine by the server. The system further includes an ROTP verification module that combines parameters comprising a cryptographic key, one-time password (OTP) information, and reflective information and generates a server ROTP using a secure cryptographic algorithm using the combined parameters, and verifies the user ROTP by comparing it to the server ROTP. The system further includes an ROTP transmission module that provides access to the requested information only when the user ROTP is valid.

DETAILED DESCRIPTION

Introduction

Figure 1:
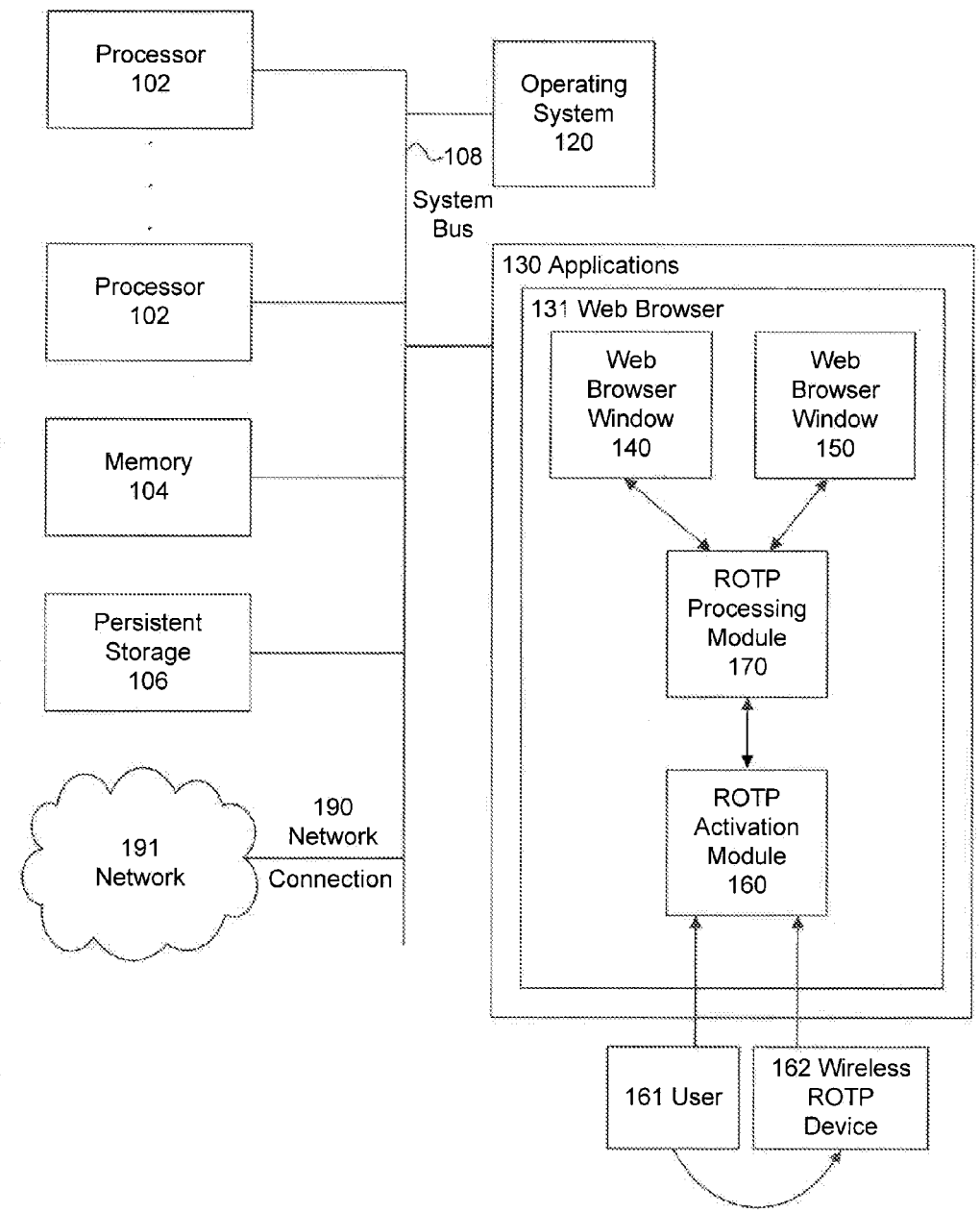
FIG. 1 is a diagram of an exemplary client that uses a reflective factor to overcome man in the middle phishing attacks, according to an embodiment.

To strengthen their login mechanisms and mitigate phishing attacks, many institutions are employing two-factor authentication schemes. In addition to the usual user name and password factors that the user knows, many institutions require a one-time password (OTP). Typically, OTPs are generated by a tool or device the user has which contains a cryptographic key and computes a "pseudorandom function" on a time or counter value. The use of a shared cryptographic key via an OTP device solves offline phishing. However, such schemes are easily seen to be vulnerable to man in the middle (MITM), or real-time, phishing. This vulnerability occurs because a MITM phisher can intercept a OTP and pass it along to a server in real-time if a system that uses an OTP does not use additional security countermeasures. Thus, recently phishers have adapted to the use of OTP. Specifically, about 30% of recent attacks on sites employing OTP are of the man in the middle type.

Embodiments are described herein that use the notion of reflective authentication factors. The embodiments demonstrate it to be a robust tool mitigating various types of phishing attacks. Reflective authentication factors take advantage of the fact that web communication channels have a "session context" that is implicitly agreed upon by the client and the server. This session context can be incorporated into the cryptographic computation. More specifically, the session context may be entangled with the key shared between the OTP device and the server. The resulting value is called the "reflective OTP" (ROTP). Examples of agreed context are the server's Uniform Resource Locator (URL) or the server's certificate. The mitigation based on the reflective factors is a consequence of the fact that if a client is phished, then the client and the phisher session have a context they agree upon. That agreed-upon context will be reflected in the ROTP. However, any session between the phisher and the server, in turn, will have a different context. This discrepancy will render the phished ROTP useless.

Embodiments reflect a scheme that implements ROTP-mitigating network based MITM attacks. An exemplary scheme uses a smartphone or other computing device that employs an extended ROTP and technology such as wireless technology that can communicate the reflective factor to the device and the ROTP back to the computer. The scheme can also operate in embodiments with legacy OTP devices and in desktop applications. Furthermore, an extended scheme exploiting wireless communication and display capabilities at the OTP device (e.g., a smartphone device) can even cope with MITM attacks in the computer (e.g., malware attacks).

In an embodiment, an OTP-based authentication scheme is disclosed that mitigates many forms of MITM phishing attacks by preventing the phisher from successfully using a user's real-time generated OTP. Thus, in case of a phishing attack, the attacker will still be unable to access the user's on-line account, no matter what information is phished from her. The scheme follows from the observation that cryptographically entangling the OTP with a mutually recognizable session context (URL, server certificate, session key, etc.) can mitigate MITM attacks as described above. This context is different when an attacker stands in the middle. Such a session context can thus serve as a new type of authentication factor. Such session contexts are referred to herein as reflective factors (as it reflects the session's context to both sides of the session) and the resulting OTPs as reflective OTPs or ROTPs.

The reflective factor thus assures (1) correctness: When there is no attack, the ROTP computed by the client will match the one computed by the server; and (2) mitigating real-time phishing, such that if a user is phished, the ROTP it computes will reflect the context of the user's session with the phisher, while the server expects an ROTP based on the context of its session with the phisher, which is different. The server will then block access to the phisher and prevent the success of the real-time phishing attempt.

Primary possible session contexts are the URL seen by the browser and the server's certificate in the SSL session. The server expects its URL and/or certificate to be used in the ROTP generation, but if a phisher is in the middle, the computation of the ROTP will use the phisher's URL instead, resulting in an incorrect ROTP from the server's perspective.

If the server requires its session with the client to be secure by, e.g., HTTPS, this requirement strengthens the reflective factor to include also the agreed-upon secret context (i.e. the session key). This requirement enables the scheme to foil a stronger form of MITM attacks in which IP requests for the server are routed to the MITM attacker site In this type of attack, the browser sees the correct server's URL but is routed to the phisher. It is important to note that there is no requirement for the user to verify the correctness of the server's certificate nor even that the session is at all secured.

Even if an attacker contaminates the domain name system (DNS) to control the name resolution process and has tricked a certificate authority (CA) to provide it with a faked certificate of a public key under the original server's true name, it still cannot phish. This is due to the fact that if the ROTP contains the certificate as part of the reflective factor, the attacker cannot forward it (since the true server expects the reflective factor to include the real certificate while the user was presented with the faked certificate).

Furthermore, if an attacker possesses malware on the computer or performs Cross Site Scripting (XSS) attacks or alternatively corrupts the smartphone, enhancements of the basic methods still cope with the attacks. The enhanced embodiments involve inclusion of the transaction data in the reflective factors and exploitation of the display capability of the smartphone to mitigate computer corruption. Then, if the attacker corrupts the smartphone alone the embodiments can still mitigate the attack. This extended scheme sends the password only from the computer (unlike other technologies which do not compartmentalize the uses of the first factor and the second factor between the two devices).

Given the above, it is important to note that the scheme used in embodiments, though believed to be quite strong, is not intended, all by itself and with various parameters, to stop all phishing attacks from happening. Phishing is an exploitation of many technologies, side measures, and social and psychological factors, and is an ever evolving threat.

Another important consideration is usability. Clearly, embodiments cannot expect the user to perform a tedious task of copying the URL (or even a hash of it) into the OTP generator device.

Also, such copying would be unacceptable from a security point of view since even expert users may be victims to homographic attacks. Similarly, other methods which require too much effort on the user side are not likely to be employed. Moreover, research has shown that security tends to be secondary to the main task users have. When security stands in the way users often perform actions that undermine it.

To demonstrate the effectiveness and ease of use of the method, embodiments have been developed using a prototype implementation of such a scheme based on the server's URL. The user role in the system is reduced (following a setup procedure) to just pointing at the URL or at an ROTP field. This interaction causes the URL to be sent to the ROTP generator. Then, the generated ROTP is sent back to the browser. Both of these functions may be performed by wireless communication. The browser then communicates the generated ROTP to the server, all without additional user intervention. Wrong actions on the user's part do not affect the functioning and security of the implementation. Another advantage of this configuration is that the pseudorandom function computed by the ROTP device does not have to be truncated and changed to six to nine characters (as in the usual OTP standard). The embodiments have been designed based on the hope that these related observations, findings and implementation will influence technology providers to provide enhancements that will enable easy to use ROTP sessions. The result is important because secure web transactions are paramount to the overall usefulness of online interactions and commerce in particular.

There are several aspects of present embodiments that distinguish them from similar attempts to achieve the same goals. In prior efforts, others have used a password-protection module (PPM) that transmits OTPs to a receiver. The mechanism is based on using an OTP value (token value) as is and typing it into the PPM. The result of the PPM is a crypto-hash (keyless operation) on the typed in PPM.

However, keyloggers can record the typed-in password or OTP and use it in real-time for real time phishing. Thus, when used with an OTP, such a system may be good against Man in the Network attacks but certainly not against Man in the Browser (Man in the User Computer) attacks. It does not matter how much naming information (URL, Certificate, other names) is used, as the problem of keyloggers doing real-time phishing exists since the PPM algorithm is public. There is no key, just a hashed password and the extra values. The fact that users are forced to enter the password as part of the operation of PPM allows keyloggers to defeat it.

Another issue is that the configuration of the PPM is based on an approach using a simple hardware token that gives OTPs over time. Also, the usability of entering the OTP into the PPM and then getting the resulting hashed-password into the application has a "usability issue" that requires too much user operation.

In contrast, embodiments of the ROTP approach described herein provide better security and better usability. Further, embodiments of the ROTP approach described herein use the fact that modern OTP are now often programmable operations on devices with communication channels (like wireless communication) and not necessary a simple hardware token with display of numbers to users to type. The device can be activated (e.g., the user has only to point at the URL). Then, the device utilizes the URL value and the ROTP device computes cryptographically with a key derived from the values that produce the ROTP. The ROTP device can communicate back (via wireless communication, for example) the value to the application, such that the value can be a long value not easily typed by humans. This embodiment defeats keyloggers attempting to obtain any valuable computation that can be used by an attacker in real time.

In an embodiment, the valid server and the valid user share the OTP seed and agree on time/counter information in operational time, and no further "trust infrastructure" is needed. Based on the shared OTP generation and the relationship with the reflective information that guarantees ROTP integrity, an embodiment presents a scenario where the valid user and the valid server will be able to communicate because the ROTP generation on each end will match for a valid connection, but not for a phisher.

An embodiment will thus generate an ROTP at the client and the server separately, based on: the seed, the time, a counter, reflective information, and a cryptographic value (applying a seed which is a key on these values and not merely a hash which is keyless). The ROTP will communicate a value to the computer application, bypassing keyloggers, and minimally involving the user (thus, offering high usability).

In an embodiment, the ROTP achieves (1) correctness, such that the authentic server presenting the reflective factors will accept the produced ROTP; and (2) security such that any man in the middle phisher presenting a different reflective factors will get a "value" which the phisher will be unable to use to successfully impersonate a user to the authentic server.

In an embodiment, a handheld device with programmability/communication generates and transmits the ROTP, in contrast to a token that operates in the background and requires user input. The notion of a strong, direct authenticator from a device to a computer or web application thus can be done without typing to avoid both phishing techniques and keyloggers. These advantages stem from the fact that all cryptographic operation is done in the mobile handheld device and no intermediate values for hashing or other non-keyed operation are given to the user computer.

Thus, embodiments represent a way of incorporating contextual information to help block phishing attempts while minimizing inconvenience to the user. By providing a variety of suggested types of contextual "reflective" information, embodiments provide for a variety of strategies that can block increasingly sophisticated types of MITM phishing attempts while permitting transparency and flexibility.

Section I herein discusses an overview of the embodiments. This section includes a discussion of exemplary hardware embodiments as portrayed in FIGS. 1 and 2 that may serve as the basis for a client-server network that uses the reflective factor protocol to provide for security measures, as well as method stages of embodiments in FIGS. 4-5. Section II discusses the operation of the reflective-factor protocol, according to an embodiment. Section III illustrates a variety of reflective factors that may be used, in accordance with embodiments, that are shown in FIG. 3. Next, section IV considers practical scenarios and extended attacks beyond MITM at the network (such as SSL rebinding, XSS, Man in the Browser malware and session hijacking after authentication), and presents protocol strengthening as attacks get stronger. Section V considers the issue that while some embodiments are based on technology that smartphones and modern browsers can support, reflective factors may also be able to be used with legacy hardware/software tokens. In Section VI, an exemplary implementation of the embodiments is provided. Section VII provides a conclusion.

SECTION I: AN EXEMPLARY CLIENT AND NETWORKED HARDWARE ARCHITECTURE

FIG. 1 is a diagram of an exemplary client that uses a reflective factor to overcome man in the middle phishing attacks, according to an embodiment.

The diagram of FIG. 1 illustrates a computing device 100 that contains a combination of hardware, software, and firmware constituent parts that allow it to run Web browser 131 with access to the Web over a network 191. Computing device 100 may be a conventional computer such as a desktop or laptop PC, but it may additionally be any Web-enabled peripheral such as a game console, a tablet, or a smartphone. Computing device 100 in the embodiment may be organized around a system bus 108, but any type of infrastructure that allows the hardware infrastructure elements of computing device 100 to communicate with and interact with each other may be used to function as this part of computing device 100.

The processing task in the embodiment of FIG. 1 is carried out by one or more processors 102, but it should be noted that any type of processing technology may be used here, including multi-core processors, multiple processors, or distributed processors. Additional specialized processing resources such as graphics, multimedia, or mathematical processing capabilities, either in hardware or in software, may also be used as adjuncts or replacements for processors 102 for certain processing tasks.

In order to manipulate data to act as an embodiment, the processors 102 access a memory 104 via system bus 108. For data which needs to be stored more permanently, the processor accesses persistent storage 106. Processors 102, memory 104 and persistent storage 106 operate in coordination with operating system 120 to provide basic functionality for computing device 100. Operating system 120 provides support functionality for a layer of applications 130. In the context of the applications 13n, computing device 100 executes a Web browser 131.

Web browser 131 may include a variety of viewing areas, which generally include windows and tabs, that provide graphical renditions of HTML hypertext Web pages and associated multimedia. FIG. 1 contains two Web browser windows: Web browser Window 140 and Web browser Window 150. These windows are examples of windows in Web browser 131 that will provide the user with a means of graphical user interface for accessing Web sites at client computing device 100 by using Web browser 131.

It is to be noted that in addition to Web browser Window 140 and Web browser Window 150, Web browser 131 has additional features. It runs ROTP Activation Module 160, which activates generation of an ROTP as described below, either by a user 161, or with the aid of a device such as wireless ROTP device 162. ROTP Activation Module 160 then activates ROTP Processing Module 170 to generate an ROTP, that works in conjunction with Web browser Window 140 and Web browser Window 150 to perform reflective one-time password processing that helps secure computing device 100 against MITM phishing attacks. This processing is described further, below.

Computing device 100 may use network connection 190 to communicate with other processing machines via network 191. Network connection 190 may be a wired connection such as Ethernet, token ring, or optical, DSL, cable, or phone connections in conjunction with an appropriate modem. Similarly, appropriate wireless technology may be used to act as network connection 190 to access a network 191. Network 191 may be the Internet, a local area network, or any other network 191 of machines with which computing device 100 may exchange data.

Figure 2:
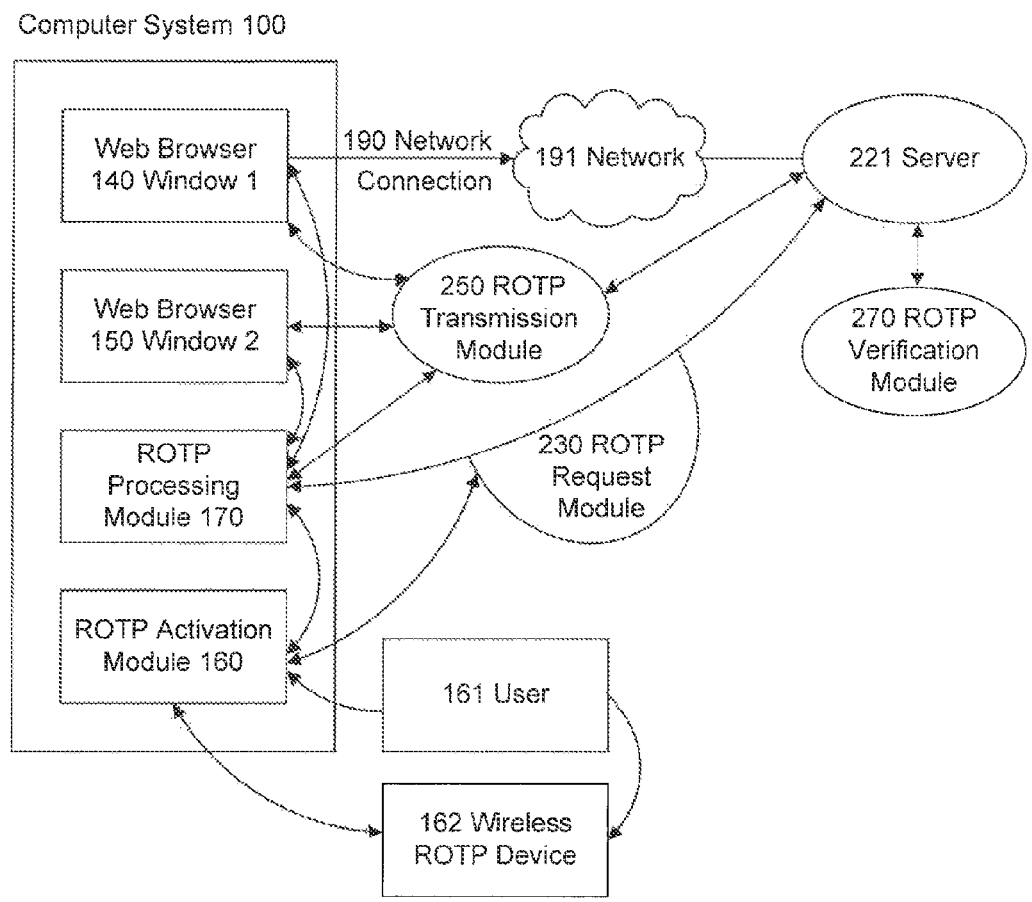
FIG. 2 is a diagram of an exemplary client-server network that uses a reflective factor to overcome man in the middle phishing attacks, according to an embodiment.
Figure 3:
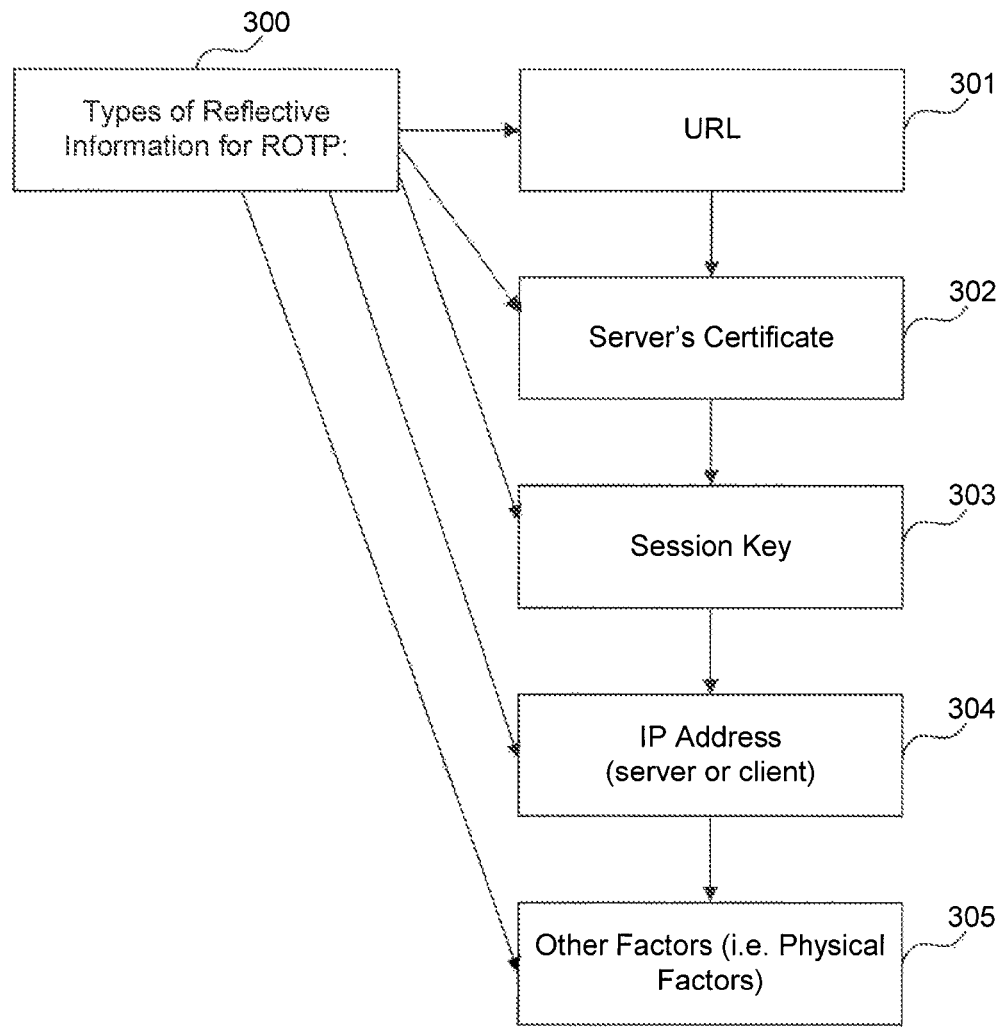
FIG. 3 is a diagram that illustrates exemplary types of information that may be used as reflective data for reflective one-time passwords, according to embodiments.

FIG. 2 is a diagram of an exemplary client-server network that uses a reflective factor to overcome man in the middle phishing attacks, according to an embodiment.

FIG. 2 illustrates a client computing device 100 which runs Web browser window 140 and Web browser window 150, that work in conjunction with ROTP input dialog 160 and ROTP processing module 170 to perform cryptographic and security analyses on a one-time password, combining it with reflective information as outlined below to provide for security of the computing device 100 by foiling MITM phishing attacks.

In an embodiment, client computing device 100 works in conjunction with network connection 190 that connects it to network 191 that hosts at least one server 221. At least one server 221 receives information from ROTP request module 230, that receives initial ROTP calculations from ROTP processing module 170 and coordinates these calculations with other types of protection such as SSL. Once at least one server 221 receives information from ROTP request module 230, at least one server 221 uses appropriate cryptographic techniques as outlined below to verify the ROTP information using ROTP verifications module 240. If the verification occurs successfully, the user ROTP is found to be valid and the server 221 then uses ROTP transmission module 250 to transmit the Web page content securely to a Web browser 131 window, such as Web browser window 140 or Web browser window 150.

Figure 4:
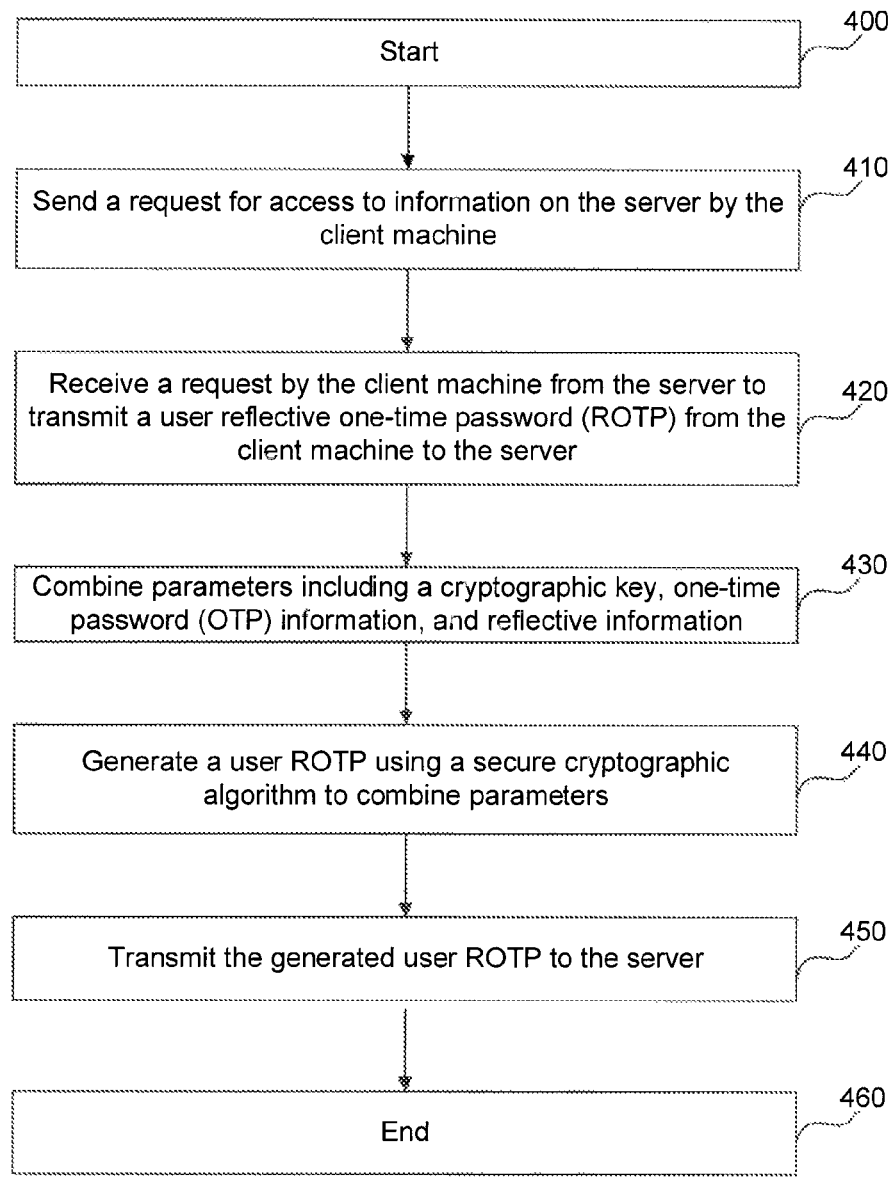
FIG. 4 is a flowchart of an exemplary method to overcome man in the middle phishing attacks, according to an embodiment.

FIG. 4 is a flowchart diagram of an exemplary method that uses a reflective factor to overcome man in the middle phishing attacks from the perspective of a client, according to an embodiment. The exemplary method begins with stage 400. Stage 410 includes sending a request for access to information on a server by a client machine. For example, a request may be sent to server 221 by client computing device 100. Stage 420 includes receiving a request by the client machine from the server to transmit a user reflective one-time password (ROTP) from the client machine to the server. For example, computing device 100 may receive a request from server 221. Stage 430 includes combining parameters including a cryptographic key, one-time password (OTP) information, and reflective information. For example, the combining may occur or activated at ROTP processing module 170. Stage 440 includes generating a user ROTP using a secure cryptographic algorithm on the combined parameters. For example, the generating may occur at ROTP processing module 170 (and may involve ROTP activation module 160, user 161 and wireless ROTP device 162). Stage 450 includes transmitting the generated user ROTP to the server. The transmitting may be performed by ROTP transmission module 250. The method ends at stage 460.

Figure 5:
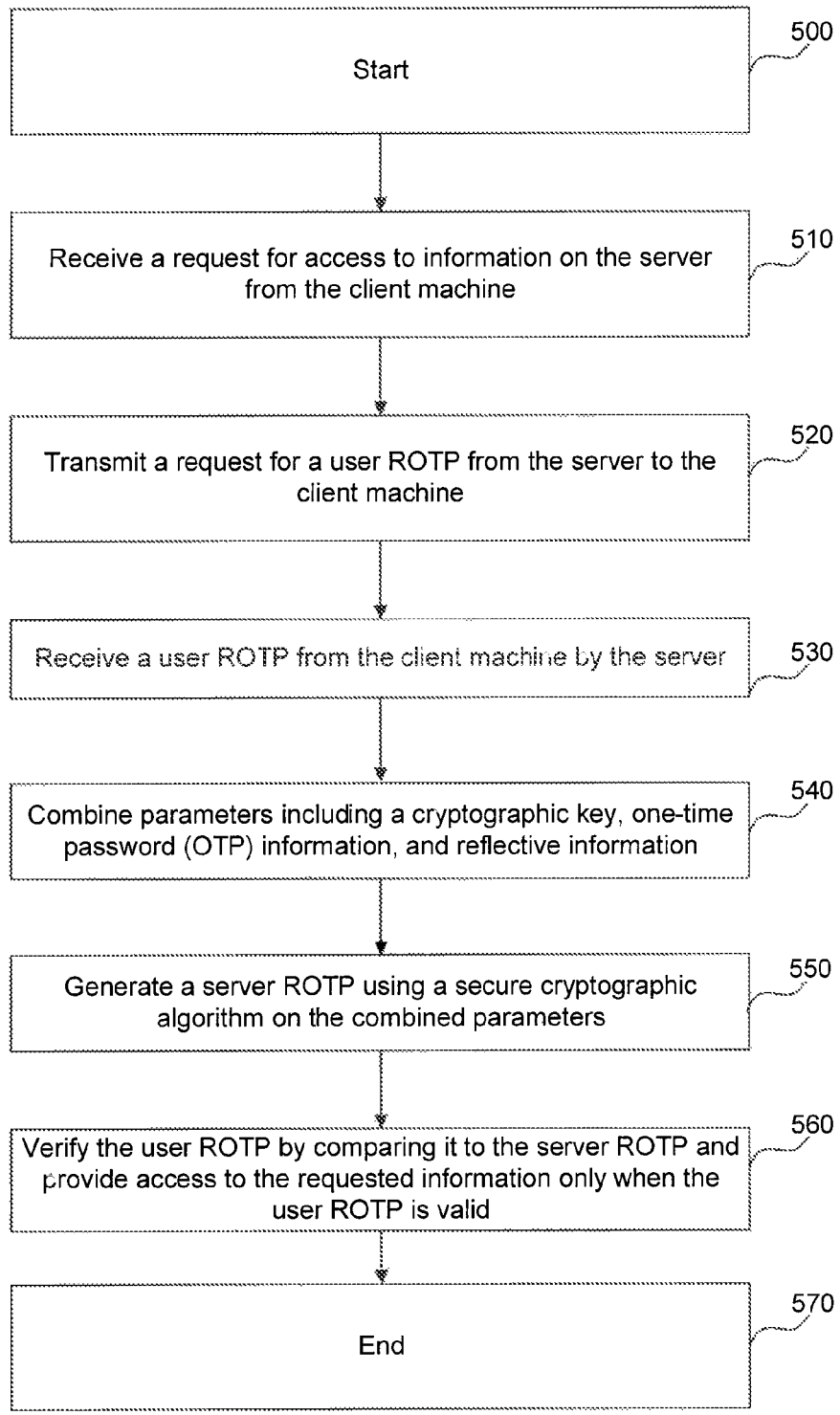
FIG. 5 is another flowchart of an exemplary method to overcome man in the middle phishing attacks, according to an embodiment.

FIG. 5 is a flowchart diagram of an exemplary method that uses a reflective factor to overcome man in the middle phishing attacks from the perspective of a server, according to an embodiment. The exemplary method begins with stage 500.

Stage 510 includes receiving a request for access to information on the server from the client machine. For example, server 221 may receive a request for information by client computing device 100. Stage 520 includes transmitting a request for a user ROTP from the server to the client machine. For example server 221 may request a user ROTP from client computing device 100. Stage 530 includes receiving a user ROTP from the client machine by the server. For example, server 221 may use ROTP transmission module 250 to receive an ROTP from client computing device 100. Stage 540 includes combining parameters including a cryptographic key, one-time password (OTP) information, and reflective information. For example, the combining may occur at ROTP verification module 270. Stage 550 includes generating a server ROTP using a secure cryptographic algorithm on the combined parameters. This generation of the server. ROTP may occur by the server 221 using ROTP verification module 270. Stage 560 includes verifying the user ROTP by comparing it to the server ROTP and providing access to the requested information only when the user ROTP is valid. The verifying may occur between server 221 and ROTP verification module 270, and then the access to the information may be provided by ROTP transmission module 250. The method ends at step 570. In the basic embodiment server ROTP and user ROTP are computed identically (in more advanced cases as in section IV, a few ROTPs will be computed, by user to be checked by server and a different one by server to be checked at the user device).

SECTION II: THE REFLECTIVE-FACTOR PROTOCOL

A. The Setting

Suppose a client C wishes to login securely to a server S over session Sess by using her browser. In case there is no attack on the session, C represents the user client and S represents the intended server the user wants to authenticate to. In case of a phishing attack in the network (man in the network), there are two sessions: one involves the user client and the phisher (where the phisher masquerades as the server), and one involves the phisher (masquerading as the user) and the real server. The aim is to deny the phisher access to the users online account at the server.

The scenario is such that protocols start with the client providing to the server her claimed identity, which is usually a user name (and possibly also a password). Since any protocol starts like this, assume (without loss of generality) that S already knows the claimed name C of the client. Thus, the protocol is only concerned with the one-time password.

An exemplary embodiment is constructed with the assumption that the user is equipped with a smart device containing (i) an application which implements the scheme; and (ii) a secret key shared with the server. The system may also require provisioning procedures, such as for establishing a new shared key and/or application (in case the key needs to be revoked, the smart device is lost, etc.) Additionally, the system may need a browser extension.

In an embodiment, the user side is assumed to be a single entity. This allows the design process to ignore issues relating to secure flow of information within the client side (between the user, smart device and browser). However, designing a system that realizes these issues is important to the ability of the system to withstand phishing attacks, therefore these issues will be discussed in embodiments further below.

Suppose that the client is being authenticated on session Sess (by the server or by the MITM phisher masquerading as the server). The following define some symbols to be used herein:

$key_{S,C}$: A secret key shared between a server S and a client C (the one which is concretely in the device). Protocols are described herein based on a shared (symmetric) secret key (such as a 128-bit key of the Advanced Encryption Standard (AES)). However, public key cryptography (e.g., a 1024 bit key RSA system) may be used instead as well.

$Chal_{S,C}$: Synchronized, non-secret, non-repeating challenge between server S and client C (e.g., time and/or counter based challenge).

MAC(key, data): a secure Message Authentication Code algorithm applied to the given data using the given key (such as the HMAC method based on cryptographic hash function SHA-1). The result of the MAC is assumed to be hard to guess, i.e., embodiments make the standard assumption that the MAC output is unpredictable. In fact, for applications such as authentication, where the resulting value is assumed hard to guess it may be assumed, in an embodiment, that the MAC is a pseudorandom function whose security relies on the secret key being private.

ID: ID here stands for user name, password, account number or any other identity-related parameter or combination of such parameters. It may also be empty. See remarks (ii) and (iii) in Section II-B.

Nonce: Represents server and/or client nonce(s), where a nonce is a cryptographic number used once (e.g. using a pseudorandom generator). It may also be empty. See Remark (ii) in Section II-B.

"$\|$": Represents concatenation (or other one-to-one reversible binary function).

B. The Current OTP Protocol

Next, a protocol is described that generalizes many of the currently used OTP protocols and denotes it the current OTP protocol:

The client C computes OTP=MAC($key_{S,C}$, $Chal_{S,C}\|ID\|nonce$) and sends it to server S (see remarks below), then S verifies the received OTP by applying the same computation and comparing values.

Remarks:

(i) In the description above, the result of the MAC computation is used as the OTP. In practice, when users have to copy the OTP, the result of the MAC computation is further processed and truncated for usability purposes (since the user is involved). For example, from the 160-bit output of Hashed Message Authentication Code (HMAC), which is used in the Hashed One-Time Password (HOTP) algorithm, between 6-9 decimal digits are extracted. It is assumed that the result of such processing and truncating gives a pseudorandom output, so that if one knows the time calculating the response is still hard. For machine to machine communication, embodiments can assume that the MAC value in its entirety is transmitted.

(ii) In HOTP, the challenge is an 8-byte counter that is synchronized between the client and server (so it does not need to be sent between them). No ID or nonce are involved. The standard mentions as possible extensions adding to the challenge identity-based parameters (such as address and PIN) or time. In contrast, as will be described in further detail below, by adding ID and allowing $Chal_{S,C}$ to include both counter and time, an OTP definition according to an embodiment herein includes such extensions. In an embodiment, the protocol also allows using server and/or client nonce(s), but in case a nonce is indeed used it may need to be sent to the other side.

(iii) In case the ID includes the user's password (or other secret information), one may consider requiring that the user enter it into the smart device rather than into the browser. Note, however, that this hurts usability. Also, it does not add much security as the password can still be phished by clever wording on the browser.

Attack: In the current OTP protocol, a MITM attacker who can impersonate to the user as the real server may get the OTP, which it can then forward to the real server, impersonating as the user.

C. The Reflective Factor Protocol

A reflective factor of a session Sess is a suing denoted $RF_{Sess}$ which satisfies the following "factor requirements":

1) Recognition: Both sides of the session Sess recognize (the same) $RF_{Sess}$.

2) Uniqueness: For any two different sessions, Sess1 and Sess2, it holds that $RF_{Sess1} \neq RF_{Sess2}$.

Protocol:

1) Client C computes ROTP=
MAC($key_{S,C}$, $Chal_{S,C}$||ID||nonce||$RF_{Sess}$) and
sends the computed ROTP to server S.

2) S verifies the received ROTP by applying the same computation and comparing values.

Remarks:

(i) Embodiments do not require that the user be aware of the value of the reflective factor.

(ii) Instead of modifying the OTP algorithm, it is also possible to entangle the reflective factor with the resulting OTP by using an additional MAC computation within the smart device.

(iii) Embodiments do not need to truncate the output of the MAC function since user involvement is minimal.

Correctness: Correctness of both protocols described in Sections B and C follows from the fact that the challenge $CHAL_{S,C}$, the ID, the nonce and the reflective factor $RF_{Sess}$ (in the reflective-factor protocol) are known to both parties. The challenge has been assumed to be synchronized, the ID can be inferred from the claimed user name, the nonce if it exists is sent over, and the reflective factor is assumed to be known to both parties. Thus both sides apply the same computation. Note that if synchronization is loose and time or counter value may be off, the server may apply a few possible nonces.

Security: As already noted, the standard protocol is susceptible to a relay attack by a MITM phisher P. Relaying to the server S the OTP it receives from the client C (and the nonce if used) allows P to masquerade as C to S.

On the other hand, in the reflective-factor protocol such relay attacks will be rejected (with the same probability as would a random ROTP).

As an example, the session between the client C and the phisher P is denoted by Sess1 and the session between P and the server S is denoted by Sess2. The ROTP sent to the phisher by the client is denoted by $ROTP_1$ and the ROTP expected by the server is denoted by $ROTP_2$. Then, $ROTP_1$ is based on $RF_{Sess1}$ and $ROTP_2$ is based on $RF_{Sess2}$. Thus because $RF_{Sess1} \neq RF_{Sess2}$ then $ROTP_1$ is for all practical purposes random and therefore unhelpful to the phisher (i.e., having $RF_{Sess2}$ and $ROTP_1$ cannot help the attacker by more than a negligible probability to guess $ROTP_2$, given that $ROTP_1$ and $ROTP_2$ are results of a pseudorandom function with different inputs).

Moreover, the task of guessing $ROTP_2$, in itself, has a negligible probability of success. Again, the difficulty of this task is because of the pseudorandomness of the MAC function (or that of the truncated output if truncation is applied). Note that the only requirement the embodiments have used is that $RF_{Sess2}$ is different than $RF_{Sess1}$. Thus, security of the protocol holds even if the session's reflective factor is not unique and/or is known to the phisher, as long as the phisher cannot cause the two sessions to have identical reflective factors. Note also that security of the protocol does not require the session to be secured in any way.

Therefore, certain exemplary embodiments provide for a computer implemented method of guaranteeing (1) client access session at a designated server, further assuring (2) non-copying of session authentication factor ROTP. Thus, in an embodiment, the method prevents permitting access by a non-designated server. In an embodiment, the method involves a client, a client machine, a client device, a designated server and attacking non-designated servers. The method begins with the client device being provisioned with a shared key between client and server. A request is sent by the client for getting permission to access to a second entity in a session. Then, the session defines reflective factors and one-time factors (i.e. nonces). Next, the client device computes an ROTP value on shared key, reflective factors and one-time factor, and the ROTP is sent to the second entity. If the second entity is the designated server, access request to the client is permitted. If second entity is one of the non-designated servers and this non-designated server further transfers (copies) the ROTP to the designated server in a second session attempting permission to access, access to the designated server is denied, foiling the copying of the authentication factor.

Thus, embodiments provide for a method for generating an authentication value (ROTP) which is useful for a client in getting access at designated server and is not usable at real-time by non-designated server to impersonate client.

The next two sections will demonstrate, first, various ways to implement the reflective factors to realize the ROTP, and then the robustness of the ROTP notion and how it can be used in conjunction with additional techniques. These techniques include those that are realizable within smart devices/phones and can be implemented as extensions of OTP devices) to deal with extended set of attackers exploiting typical weaknesses of web technologies.

SECTION III. POSSIBLE REFLECTIVE FACTORS

This section next discusses several exemplary embodiments for a reflective factor and the protection each of them gives against Man In The Network (MITN) attacks, still relating to the client as a single entity. Because none of the candidates for reflective factors fully satisfy the second factor requirement (uniqueness), this application distinguishes between two types of MITN attacks (extending the discussion beyond the real time phishing attack discussed above), according to the status of the reflective factor.

In a Different-RF attack, the reflective factor in the session between the user and phisher is different than that in the session between the phisher and server (as in the regular real-time phishing).

In a Same-RF attack, the reflective factor in the session between the user and phisher is identical to that in the session between the phisher and server.

As shown above in Section II-C, attacks of the Different-RF type, which are the most typical ones, will fail when using the reflective factor protocol. This section of the application thus only considers attacks of type Same-RF.

FIG. 3 is a diagram that illustrates exemplary types of information that may be used as reflective data for reflective one-time passwords, according to embodiments Exemplary types of reflective information that may be used as information for an ROTP include a URL 301, a server's certificate 302, a session key 303, an IP address (server or client) 304, and other factors (e.g., physical factors) 305. These factors are detailed below.

A. URL

First, note that the URL satisfies the first factor requirement, recognition, in the definition of a reflective factor (i.e., both sides to a session know the URL). The second requirement, uniqueness, is not always satisfied, e.g., by the attacker contaminating DNS entries so that the browser uses the correct server's URL but is routed to the phisher.

Fortunately, such attacks will not work if the server requires its session with the client to be secure (HTTPS). The reason is that, in this case, the browser uses the correct server's URL, and it also uses the correct server's certificate. Thus, assuming the MITM attacker cannot break the server's public key, he is no more than an observer of encrypted traffic so such an attack will fail.

Because in virtually all implementations of a two-factor authentication scheme the server requires secure session by SSL/TLS, it follows that using the URL as a reflective factor in these server-certificate based sessions fully mitigates both attack types.

Remarks:

(i) Although the URL is the only factor used in this exemplary ROTP computation, embodiments may implicitly use, in this case, a reflective factor based on the URL and the session key wrapping it inside. This implicit factor is denoted herein as a nested URL or, in the general case, a nested reflective factor.

(ii) It is important to note that insistence on a secure session would not help when the current OTP protocol (rather than the reflective factor protocol) is used. When the current OTP protocol is used, the MITM phisher will get the correct OTP from the user client (on a secure or insecure session between the client and phisher), and relay that OTP to the server on a secure session between the phisher and the server.

(iii) The URL is a built-in factor in the infrastructure which is extremely versatile, as it may encode almost any additional information as may be required. For example, the server may incorporate into the URL transaction data, messages to the smart device, and more.

B. Server's Certificate

As with the URL, when the server's certificate (a public key certificate signed by a certification authority (CA)) is used as the reflective factor, recognition is satisfied but uniqueness is not in general satisfied since an attacker may present the server's certificate as well as contaminate DNS entries. Also, as with the URL, such an attack will not work if the server requires its session with the client to be secure (HTTPS), because the scheme uses implicitly a nested reflective factor (the SSL/TLS session key wraps the server's certificate).

Additionally, using the server's certificate as the reflective factor foils an attack in which, in addition to contaminating DNS entries, the attacker uses a fake certificate of the server (issued by an untrusted CA). The attack is foiled because the provider expects the ROTP to be based on its own certificate and not on the fake one.

Remark: The server's certificate can be used together with the URL and allow also the inclusion of transaction data. In general, combining several reflective factors gives the accumulative benefits of all the factors.

C. Session Key

Suppose any of the SSL/TLS session keys with the server (or a pseudorandom function of it) are available to be used as a reflective factor in addition to the server's certificate (and possibly also the URL). In addition to foiling the previous attacks, this foils an additional attack where a malicious JavaScript attack on the page steals the ROTP from the page and sends it to a malicious attacker, which can then serve as a client and authenticate as the user. Such an attack is foiled because the server expects that the ROTP be based also on that session key, but the session key between the attacker and the server would be different. Section IV-C describes how to deal with such an attack when session keys are not available to be used as reflective factors.

Note that the application considers here XSS attacks on the authentication protocol and not attacks on already authenticated sessions. Such attacks are considered later together with general malware. Indeed, there may potentially be other ways in which a malicious script may abuse the session.

D. IP

In some cases, a client IP address, a server IP address, or both may serve as reflective factors provided they can satisfy the first factor requirement of recognition. Recognition of the same IP address on both sides may be complicated by the fact that intermediary devices may be changing the IP address. The client IP can be used only if it is known that it has not been modified (by e.g., proxies). The server IP can usually be used, when it can be assured that the server knows its own IP as seen by the client, which may not be the case when IP anycast or load balancing mechanisms (such as netscalers) are used. Sometimes the whole IP address cannot be used but a part of it can (e.g. high bits). On the client side, a browser plug-in can look into the DNS cache to discover the server domain name to IP address mapping.

In practice, using a server's IP address is better as a server would generally know if its IP address (or its high bits) is known to a client. Only then would including IP address in ROTP calculation be requested of the client by the server. Another alternative to using high bits is to use the server's location as known by mapping the server's IP address to an approximate location.

To examine Requirement 2, uniqueness, as well as attacks on a such a system, let embodiments assume that the Server IP is used as a reflective factor. First note that Requirement 2 is not in general satisfied, since the MITM phisher may subvert the routing infrastructure.

Unfortunately, because the server's IP address is not strongly correlated with the server's certificate, the MITM attacker can complete an attack against a system using the server's IP as a reflective factor even if the server requires a secure (HTTPS) session. To complicate the attacker's task, embodiments assume that the server uses different IPs for secure (HTTPS) and non-secure (HTTP) sessions. The stages required from an attacker to launch such an attack are now described. These steps demonstrate that carrying out the attack is very expensive. Countermeasures are also suggested.

In an example attack, the phisher presents the client with a wrong URL. He cannot present the user with the correct server's HTTPS URL since this would cause the session to be secure. He also modifies DNS entries so that on client request, the server's IP would be returned. This stage is required, because the correct server's IP is associated with a server's HTTPS URL). Additionally, because the correct server's IP is used, the phisher must also subvert the routing infrastructure so that connections to the server's IP would be routed to him. Such an advanced attack requires heavy resources, and can be mitigated by, e.g., using secure DNS.

E. Other Factors

Time and location and other "physical factors" suggested for relay attack prevention, can in principle (but generally not in practice) serve as reflective factors.

SECTION IV: PRACTICAL CONSIDERATIONS AND EXTENDED ATTACKS

It is assumed throughout this section that the reflective factor is the URL and that the server requires that its authentication session with the client be secure (HTTPS).

A. Secure Communication of the ROTP

Recall that the reflective factor protocol in Section II-C and its analysis as well as the discussion of the URL as a reflective factor both assume that the client is a single entity. Thus, this analysis ignores issues related to the flow of information (specifically, the reflective factor and the ROTP) within the client environment. In this section, a technological solution to these issues is provided.

In order to get the ROTP required in its session with the server, the phisher applying the Different-RF attack would need the smart device to use in its ROTP computation the URL used in the phisher's session with the server. Attacks which just spoil the ROTP computation are not described herein since they only provide denial of service, which a MITM attacker, given its location in the middle, can easily achieve by other means.

As mentioned in Section II-A, a browser extension is utilized. In an embodiment, this extension may be incorporated directly into the browser. In an embodiment, the extension communicates with the smart device through the a secure wireless protocol (or any other secure channel). Using wireless communication requires the user to perform a one-time pairing procedure between her machine and the smart device. In an embodiment, the extension adds itself into a page that contains a specific string (such as a field named "ROTP") waiting for a predefined event (e.g., clicking a predefined button added by the extension, clicking an ROTP field, submitting the page, etc.). When the event occurs, the extension sends the page URL to the smart device and copies the received ROTP into a specified field in the page. The extension can either submit the page or let the user (or code on the page) submit it later.

In case of a Different-RF attack this ROTP would be sent to the phisher (and be exposed to the phisher's code) but, as argued before, it would be different from the value expected by the server in its session with the phisher. In the case of a Same-RF attack or simply a session with the genuine server, the page comes from the server and the embodiment assumes it is safe.

Embodiments may involve other methods for communicating the ROTP, although they may be subject to vulnerabilities. In a Manual method, the browser generates a (short) hash of the URL (so the ROTP would be based on the hash of the URL rather than on the URL itself), the user types it into the device, and then types the result back into the browser. With a QR-code method, the browser displays a QR-code of the URL, the user scans it with the smart device, and types the result into the browser. Even without considering the user's last action of typing the ROTP to the browser, both the Manual and QR-code methods are much more susceptible to a phisher's Different-RF attack than the communication channel method. The susceptibility occurs since the user involvement is increased: Denote by $URL_{PS}$ the URL in the phisher's session with the server and by $URL_{PU}$ the URL in the phisher's session with the user client. The phisher may trick the user into initiating the authentication procedure on the user's session with the phisher. In the case of the Manual method the phisher could then display the hash of $URL_{PS}$ (instead of the hash of $URL_{PU}$) and in the case of the QR-code method, the phisher can display the QR-code of $URL_{PS}$ (instead of the QR-code of $URL_{PU}$). In both cases the ROTP that would be sent to the attacker allows him to masquerade to the server as the user. Thus, if these methods are employed, careful user guidelines are needed to bind the URL used and the page responded to in a clever way. Moreover, usability of both methods above (in particular of the Manual one in which the user needs to type information into the smart device) is inferior to that of wireless communication. On the other hand, wireless communication requires a one-time pairing procedure between the user's machine and the smart device.

B. Routing to a Different User Registered Website

A user is typically registered with multiple web sites and each may have its servers expecting an ROTP protocol to be satisfied before entrance is granted. It is always possible for a MITM attacker to switch a client's connection from one intended "user-registered web site" to another simply by sending a redirect message or by acting as a MITM actually relaying all messages back and forth between the client and the server. However, this is not too damaging because the SSL connection would be extended from the client to the server and the MITM phisher would not be able to eavesdrop or effectively intervene in the communication. Secondly, the client should eventually realize that it is at a wrong web site and log off. In fact, such an attack is no different than an accident where the user logs into one web site and only afterwards realizing that she really meant to log in to another.

C. Additional Types of Attacks

Embodiments address two more types of attacks: Man In The Browser (MITB) in which the phisher has installed malware on the user's machine and Man In The Device (MITD) in which the phisher has malware in the user's smart device.

XSS attacks: Section III-C shows that using a session key with the server as the reflective factor prevents an ROTP stolen from the page and sent to the attacker by malicious JavaScript code from being used to authenticate as the user. If a session key with the server is not available, embodiments can use instead a session key established between the server and the phone. Note that this variant of the protocol also solves the situation of SSL rebinding attacks.

More generally, two extensions to the protocol are described below. Note that in an embodiment the session key between the server and smart device, i.e., phone can be taken from the result of the two-way authentication described first.

Two-Way Authentication:

In an embodiment, the reflective factor protocol allows the server to authenticate the client but does not prevent phishing in the strong sense. It only ensures that no matter what information was phished, this information cannot be used to masquerade the user to the (specific) server. When a smart device is used, in an embodiment, it is possible to extend the scheme and authenticate the server as well (server sending to device a differently computed ROTP to be checked). The smart device may then warn the user if the server has not been authenticated within a very short while following client authentication.

Direct Communication Channel with the Server:

In an embodiment, the smart device may communicate directly with the server. For example, when using the URL as a reflective factor, the device may access the server directly via a second URL which is a variation on the original URL used by the browser. The original URL may be cryptographically secured (using, e.g., MAC of the URL with the shared key) to ensure that the smart device only visits genuine server sites. Using this channel, (secured) transaction data or other information may be sent to the device without involving the browser. Note that the reflective factor must be delivered to the smart device from the user's machine and not from the server as it needs to represent the session in which the user client takes part.

Man in the Browser (MITB) attacks:

MITB keyloggers: When using wireless communication, embodiments withstand MITB keyloggers as the ROTP is not typed by the user.

General MITB: Some embodiments as described do not protect against a general attacker that totally controls the browser or the machine since a MITB could eavesdrop or insert messages in the SSL session or request authentications. Similarly, XSS attack post initial authentication can have this nature. Because embodiments can additionally reflect context, it is possible, in addition to user initial authentication, to provide transaction authentication by incorporating transaction data into the computation of the ROTP, and to be used for authentication of transaction stages (even user initial authentication can be handled as a random transaction, as well). The interaction may require a few ROTP computations by the device and the server to assure transaction safety; from the user point of view, she may have to check the display on the browser and approve the transaction. For example, when transferring money between accounts, the account numbers and amounts involved can be part of the data which is also integrated into the ROTP computation. The transaction data with initial ROTP may then be (1) sent to the server, and then (2) sent from the server to the device with differently computed server ROTP, (3) it should then be displayed on the device for user confirmation (after checking against the differently computed server ROTP displayed by server on browser which was displayed, i.e., entered by user, into the device), before (4) the yet another final ROTP is computed and sent to the server after user confirmation.

Man In The Device (MITD) attacks: The attacker can get access to the long-term shared key between the device and the server and thus can create any ROTP it desires. Even without access to the long term key, the attacker can request an ROTP for any URL of its choice. However, the attacker will still not be able to complete the protocol without knowing the other factor (i.e., the secret password). Such an attack demonstrates that having a strong second factor does not diminish the importance of using also a strong first factor (i.e., choosing a password wisely). The principle of compartmentalizing the various factors is important whenever possible and is advocated here.

SECTION V. EMPLOYING LEGACY DEVICES

This section discusses how to add reflective factors when using legacy devices with no input capability (such as RSA's SECURID), according to an embodiment. Thus, the reflective factor may need to be incorporated into the computation in the user's machine. This may represent an interim situation in which some of the users have already migrated to use an ROTP generated by a smart device and some still have not.

To limit access of a phisher to the raw OTP computed by the legacy device, embodiments are designed to rely as little as possible on the browser interface and use instead an ad-hoc application on the user's machine. Thus, by some decrease in usability embodiments gain much improved security. Some embodiments also use a browser extension which will communicate with the application by, e.g., interprocess communications to assure that ROTP only flows through the session it belongs to (as with wireless communication with the smart device in Section IV-A).

The ad-hoc application uses as inputs the OTP and the reflective factor. The OTP will be copied by the user to the application from her legacy device. The reflective factor would come from the extension.

It remains to describe an exemplary protocol for entangling the reflective factor with an OTP generated by a legacy device. As in Section II-C $RF_{Sess}$ denotes the reflective factor over session Sess and || denotes concatenation. The symbol h denotes a cryptographic (secure) hash function, i denotes a measure of the required security, and iOTP denotes i consecutive OTPs (the OTPs contain only decimal digits).

In a related embodiment that utilizes a legacy device, the user types the token value into the mobile device. Then, the device calculates the hash, an application receives the hash, and only the final value is sent to the Web application. The user may also type two or more OTPs from the legacy device into the hand held device. The hashing may help to avoid keyloggers because the user's input is transformed before it is conveyed over the network.

Protocol

In an embodiment, the client computes ROTP=h $(n_c||iOTP||RF_{Sess})$ where $n_c$ is a long random nonce chosen by the client, and sends ROTP and $n_c$ to the server.

The server verifies by executing the same computation. Since the user needs to type each OTP into the application, then to achieve acceptable usability the value of i will likely be either 1 or 2. An attack by the phisher may be to compute the OTP from the ROTP by brute force, and then generate the required ROTP (that is, the ROTP over its session with the server). This requires $10^{i \cdot |OTP|}$ hash computations (assuming the OTP is given in decimal digits) which is $10^{12}$ if |OTP|=6 (the minimum recommended by prior results) and i=2. Because of the long random nonce $n_c$ this computation cannot be applied offline. Because the phisher needs to apply the computation online for each user, it significantly limits the number of users that can be attacked simultaneously. In fact, even the case i=1 (the user only copies one OTP into the application), which requires one million hash computations, is a significant barrier against a large-scale attack.

Still, when i=1 (and usability may dictate that this be the case), this barrier may be insufficient for some applications. In an embodiment, the Secure Remote Password (SRP) protocol is used for proving knowledge of the ROTP. In an alternative embodiment, techniques are used which make exhaustive search harder by repeated hashing and/or using an omitted secret value, aka "a pepper".

TABLE 1

Summary of Exemplary Embodiments

| Attack type | Factor checked by server | Technology |
|---|---|---|
| Plain phishing (different URL) | URL | Smart device |
| Phishing + DNS poisoning (same URL) | URL + HTTPS | as above |
| Phishing + DNS poisoning + fake cert | URL + HTTPS + server's cert | as above |
| Phishing + DNS poisoning + fake cert + XSS | URS +HTTPS + server's cert + session key | as above |

TABLE 1-continued

Summary of Exemplary Embodiments

| Attack type | Factor checked by server | Technology |
| --- | --- | --- |
| Malware | URL + HTTPS + Transaction data + user confirmation on device to server | Smart device with input capabilities and display |

SECTION VI. IMPLEMENTATION AND EXPERIMENTATION

In accordance with an embodiment, an exemplary client-server system which was based on the HOTP protocol specified in RFC 4426 has been modified to also accept an ROTP which uses the URL as the reflective factor. The exemplary system as modified uses as a challenge the current time in seconds since epoch (Jan. 1, 1970). In this exemplary system, the server verifies whether an OTP generated with any timer t−r, . . . , t+r matches the received OTP, where t is the current time and r is a predefined constant (a window was used to account for problems with clock synchronization). In the exemplary system, the only change that was applied in both the client and server was to concatenate the login page URL to the time before the HMAC was applied as a pseudorandom function (i.e., the embodiment generated a related pseudorandom function minimizing software changes). In the exemplary system, inter device communication employed the BLUETOOTH communication system. In other exemplary systems in accordance with embodiments, the system's back-end has been modified and tested with a command line ROTP generator whose code was taken from the system's phone OTP client (modified to include the URL).

SECTION VII. CONCLUDING REMARKS

Existing authentication devices prevent someone who guesses or phishes for the password from using it, since the OTP adds entropy to the login procedure by changing the OTP over time. Embodiments described herein enable not just the principle of "added entropy" but also the principle of "added context." In embodiments, some agreed upon value is reflected in the context, in order to bind the added entropy to that context (which is possible in the presence of pseudorandom functions). This principle is based on the capabilities of authentication tokens, which may also be used in other settings. Additionally, embodiments described herein are not intended to stop all phishing attacks from happening, since phishing is an exploitation of many technological, social and psychological factors, and is an ever evolving threat which definition may evolve as well. In particular, the phisher may still be able to phish the user for personal information. Moreover, the "user sign on" is a procedure within a larger system. Several authentication mechanisms may coexist, and the system can only be as strong as the weakest among them. Nevertheless, the reflective factor in accordance with embodiments described herein is such a strong binding mechanism that the various extensions demonstrate its robustness and show how it can be used in many authentication settings in various attacks on computing networks and computing devices where other tools do not work.

What is claimed is:

1. A computer-implemented method of guaranteeing session integrity between a user at a client machine and a server, comprising:

obtaining, from the server, reflective information comprising a URL of the server, certificate for the server, and a session key;

sending a request for access to information on the server by the client machine;

receiving a request by the client machine from the server to transmit a user reflective one-time password (ROTP) from the client machine to the server;

combining parameters comprising a cryptographic key, a one-time password (OTP) information, and the reflective information by concatenating each of the cryptographic key, the OTP, and the reflective information;

generating a user ROTP by using a secure cryptographic algorithm on the combined parameters; and transmitting the generated user ROTP to the server.

2. The computer-implemented method of claim 1, wherein no intermediate values for hashing or other non-keyed information are used by the client machine to generate the user ROTP.

3. The computer-implemented method of claim 1, wherein the transmitting of the user ROTP to the server occurs wirelessly.

4. The computer-implemented method of claim 1, wherein the client machine and the server are connected using an SSL/TLS secure connection.

5. The computer-implemented method of claim 1, wherein generating the user ROTP comprises generating the user ROTP using transaction data.

6. The computer-implemented method of claim 1, wherein generating the user ROTP comprises generating the user ROTP using a Message Authentication Code (MAC) algorithm in combination with the parameters.

7. A computer-implemented method of guaranteeing session integrity between a user at a client machine and a server, comprising:

receiving a request for access to reflective information on the server from the client machine, the reflective information comprising a URL of the server, certificate for the server, and a session key;

transmitting a request for a user ROTP from the server to the client machine;

receiving a user ROTP from the client machine by the server;

combining parameters comprising a cryptographic key, a one-time password (OTP) information, and the reflective information by concatenating each of the cryptographic key, the OTP, and the reflective information;

generating a server ROTP by using a secure cryptographic algorithm on the combined parameters; and verifying the user ROTP by comparing it to the server ROTP and providing access to the requested information only when the user ROTP is valid.

8. The computer-implemented method of claim 7, wherein no intermediate values for hashing or other non-keyed information are used by the server to generate the server ROTP.

9. The computer-implemented method of claim 7, wherein the transmitting of the user ROTP to the server occurs wirelessly.

10. The computer-implemented method of claim 7, wherein the client machine and the server are connected using an SSL/TLS secure connection.

11. The computer-implemented method of claim 7, wherein generating the server ROTP comprises generating the server ROTP using transaction data.

12. The computer-implemented method of claim 7, wherein generating the server ROTP comprises generating the server ROTP using a Message Authentication Code (MAC) algorithm in combination with the parameters.

13. A system designed to guarantee session integrity between a client machine and a server, wherein the client machine comprises a processor configured to:
   send, via an ROTP request module, a request for access to reflective information on the server by the client machine, the reflective information comprising a URL of the server, certificate for the server, and a session key;
   receive, via an ROTP transmission control module, a request by the client machine from the server to transmit a user reflective one-time password (ROTP) from the client machine to the server;
   combine, via an ROTP processing module, parameters comprising a cryptographic key, a one-time password (OTP) information, and the reflective information by concatenating each of the cryptographic key, the OTP, and the reflective information and generates a user ROTP by using a secure cryptographic algorithm on the combined parameters; and
   transmit, via an ROTP transmission module, the generated user ROTP to the server.

14. The system of claim 13, wherein no intermediate values for hashing or other non-keyed information are used by the client machine to generate the user ROTP.

15. The system of claim 13, wherein the ROTP transmission module transmits the user ROTP to the server wirelessly.

16. The system of claim 13, wherein the client machine and the server are connected using an SSL/TLS secure connection.

17. The system of claim 13, wherein the ROTP processing module generates the user ROTP using transaction data.

18. The system of claim 13, wherein the ROTP processing module uses a Message Authentication Code (MAC) algorithm in combination with the parameters to generate the user ROTP.

19. A system designed to guarantee session integrity between a user at a client machine and a server, wherein the server comprises a processor configured to:
   receive, via an ROTP request module, a request for access to reflective information on the server from the client machine, transmits a request for a user ROTP from the server to the client machine, and receives a user ROTP from the client machine by the server, wherein the reflective information comprises a URL of the server, certificate for the server, and a session key;
   combine, via an ROTP verification module, parameters comprising a cryptographic key, one-time password (OTP) information, and reflective information by concatenating each of the cryptographic key, the OTP, and the reflective information and generates a server ROTP by using a secure cryptographic algorithm on the combined parameters, and verifies the user ROTP by comparing it to the server ROTP; and
   provide, via an ROTP transmission module, access to the requested information only when the user ROTP is valid.

20. The system of claim 19, wherein no intermediate values for hashing or other non-keyed information are used by the client machine to generate the user ROTP.

21. The system of claim 19, wherein the ROTP transmission module transmits the user ROTP to the server wirelessly.

22. The system of claim 19, wherein the client machine and the server are connected using an SSL/TLS secure connection.

23. The system of claim 19, wherein the ROTP verification module generates the server ROTP using the server's certificate.

24. The system of claim 19, wherein the ROTP verification module generates the server ROTP using transaction data.

25. The system of claim 19, wherein the ROTP verification module uses a Message Authentication Code (MAC) algorithm in combination with the parameters to generate the server ROTP.

26. A method for establishing a shared connection between a client and a server, wherein a shared key has been provisioned between the client and the server, comprising:
   identifying session parameters including one-time password (OTP) information and reflective information comprising a URL of the server, certificate for the server, and a session key;
   combining the shared key and the session parameters into a combined parameter by concatenating each of the shared key and the session parameters, wherein the session parameters include the OTP information and the reflective information;
   encrypting the combined parameter to generate a reflective one-time password (ROTP);
   sending the ROTP to a remote entity;
   receiving access to the remote entity when the remote entity is the server; and receiving a denial of access to the remote entity when the remote entity is not the server.

* * * * *